United States Patent
Chou et al.

(10) Patent No.: US 9,053,368 B2
(45) Date of Patent: Jun. 9, 2015

(54) IMAGE TRANSFER APPARATUS AND METHOD THEREOF

(75) Inventors: Hong-Long Chou, Taipei (TW); Wen-Yan Chang, Zhunan Township (TW); Tai-Chang Yang, Kaohsiung (TW)

(73) Assignee: Altek Corporation, Hsinchu (TW)

( * ) Notice: Subject to any disclaimer, the term of this patent is extended or adjusted under 35 U.S.C. 154(b) by 250 days.

(21) Appl. No.: 13/591,658

(22) Filed: Aug. 22, 2012

(65) Prior Publication Data

US 2013/0342708 A1 Dec. 26, 2013

(30) Foreign Application Priority Data

Jun. 20, 2012 (TW) .............................. 101122086 A

(51) Int. Cl.
*G06K 9/00* (2006.01)
*H04N 1/00* (2006.01)
*H04N 1/32* (2006.01)
*H04N 5/232* (2006.01)

(52) U.S. Cl.
CPC ........ *G06K 9/00677* (2013.01); *H04N 5/23219* (2013.01); *H04N 1/00137* (2013.01); *H04N 1/00167* (2013.01); *H04N 1/00172* (2013.01); *H04N 1/00336* (2013.01); *H04N 1/32048* (2013.01)

(58) Field of Classification Search
CPC .......... G06K 9/00288; G06K 9/00677; H04M 1/72552
USPC .............. 382/118, 305, 224; 455/414.2, 41.2, 455/456.5, 456.3, 456.6, 406, 407, 408
See application file for complete search history.

(56) References Cited

U.S. PATENT DOCUMENTS

| 2009/0186603 A1* | 7/2009 | Usami et al. ................ 455/414.2 |
| 2010/0150407 A1* | 6/2010 | Cheswick ..................... 382/118 |

* cited by examiner

*Primary Examiner* — Mike Rahmjoo
(74) *Attorney, Agent, or Firm* — Wang Law Firm, Inc.; Li K. Wang; Stephen Hsu

(57) ABSTRACT

An image transfer apparatus and a method thereof comprise: capturing at least one first image, wherein the first image includes at least one face image; performing a face detection to obtain at least one face feature; a database has at least one identification information which comprises at least one face photo and a corresponding communication information; comparing the face feature with the face photo saved in the database; retrieving the corresponding communication information and the identification information corresponding to the face photo, if the face feature matches the face photo; performing the face image processing corresponding to the identification information in the first image, so as to obtain at least one second image; transmitting each second image according to the communication information of the processed face image in the second image.

10 Claims, 5 Drawing Sheets

IMAGE TRANSFER APPARATUS AND METHOD THEREOF

CROSS-REFERENCE TO RELATED APPLICATIONS

This application claims priority under 35 USC §119 to Taiwan Patent Application No. 101122086, filed on Jun. 20, 2012 in the Taiwan Intellectual Property Office (TIPO), the contents of which are herein incorporated by reference in their entirety.

BACKGROUND

1. Field of the Invention

The present invention relates to an image transfer apparatus and a method thereof, in particular to an imaging processing technology of the image transfer apparatus integrated with a face recognition function, so that group photos taken at the same time can be transmitted to each individual object, and only individual's face image is differentiated.

2. Description of the Related Technology

In general, when a group photo is taken, smartphones or cameras are used to ensure that everyone takes the group photo, or the owner of the smartphone or camera needs to send the group photo to the persons in the group photo one by one. Obviously, such operation is very inconvenient.

Therefore, a conventional apparatus performs a face recognition function of all face images in the group photo to recognize each person in the group photo, and then sends the photo to the smartphone of each person that registered in an address book of the smartphone or cameras. In addition, a menu provides users to select each face image to be transmitted, add an address book or send a message.

However, the prior art only transmits the photo to the persons in the group photo mechanically, but the function of sharing a photo is popular in present Smartphones and cameras. Most image transfer apparatus users want to have their own images in the group photo to be optimized, so that the photo sharing effect is added.

In addition, the users also want to appropriately process the face recognition to improve the system performance and the user's fun of using the apparatus.

SUMMARY OF THE INVENTION

In view of the problems of the prior art, it is a primary objective of the present invention to overcome the problems by providing an image transfer apparatus and a method thereof in accordance with the present invention.

To achieve the aforementioned problems, the present invention provides an image transfer apparatus, comprising an image capturing unit, a face detection unit, a database, a face recognition unit, a processing unit and a transfer unit.

Wherein, the image capturing unit is used for capturing at least one first image, and the first image includes at least one face image. The face detection unit is provided for performing a face detection of the first image to obtain at least one face feature. The database has at least one identification information, and the identification information includes at least one face photo and a communication information. The face recognition unit is provided for comparing the face feature with the face photo, wherein if the face feature matches the face photo, then the communication information and the identification information corresponding to the face photo are retrieved from the database. The processing unit is provided for processing the at least one face image corresponding to the identification information in the first image according to the identification information obtained by the face recognition unit, so as to obtain at least one second image. The transfer unit is provided for transmitting the second image according to the communication information of the corresponding processed face image in the second image.

Wherein, the image transfer apparatus of the present invention further comprises an update unit for reminding an user to add or update a face photo if the face feature does not match the face photo.

Wherein, the transfer unit is provided for performing a compressed transfer or a thumbnail transfer.

Wherein, the processing unit generates a plurality of second images if there are plural identification information obtained by the face recognition unit, and only one of the face images of the second images is processed.

Wherein, the communication information is a telephone number or an email address, and the second image is transmitted in a format of multimedia information or email.

To achieve the aforementioned objective, the present invention provides an image transfer method, comprising: capturing at least one first image, wherein the first image comprises at least one face image; performing a face detection of the first image to obtain at least one face feature; performing a face recognition, and comparing the face feature with at least one face photo of a database, wherein the database has at least one identification information, and the identification information includes at least one face photo and a communication information; retrieving the communication information and the identification information corresponding to the face photo from the database, if the face feature matches the face photo; performing at least one image processing of the face image corresponding to the identification information in the first image according to the identification information obtained after the face recognition takes place, so as to obtain at least one second image; and transmitting the second image according to the communication information of a processed face image in the second image.

Wherein, the image transfer method of the present invention further comprises reminding an user to add or update a face photo, if the face feature does not match the face photo.

Wherein, the second image is transmitted according to the communication information corresponding to the processed face image in the second image through a compressed transfer or a thumbnail transfer.

Wherein, a plurality of second images is generated if a plurality of identification information is obtained after the face recognition takes place, and only one of the face images in each of the second images is processed.

Wherein, the communication information is a telephone number or an email address, and the second image is transmitted in a format of multimedia information or email.

In summary, the image transfer apparatus and method of the present invention have the following advantages: if it is necessary to send the photo to a specific recognized person, the image of the person can be optimized individually or specifically. The receivers can receive their most perfect images of the photo. In addition, useful information such as the birthdate and sex are generally saved in the address book, so that before the photo is transmitted, the photographing date is compared with the birthdate, and if the photographing date is the birthdate of a person, the photo of such person will be processed with a special pattern such as adding a birthday cap to the image of the person. For different sexes, the weight of optimizing the personal images between male and female can be set differently.

Further, the image transfer apparatus of the present invention also can display a reminder for an unrecognized face image. If the identification information of such person has been saved in the database, a photo will be added into the database and adjusted appropriately to enhance the future face recognition rate. If the identification information of the person corresponding to the face image has not been saved in the database, then the image transfer apparatus of the present invention will ask the user whether or not to carry out a registration procedure to built new contact information to facilitate the user to develop human relationship.

The advantages and spirit of the present invention will become apparent with the detailed description of preferred embodiments and the illustration of related drawings as follows.

DESCRIPTION OF THE PREFERRED EMBODIMENTS

Figure 1:
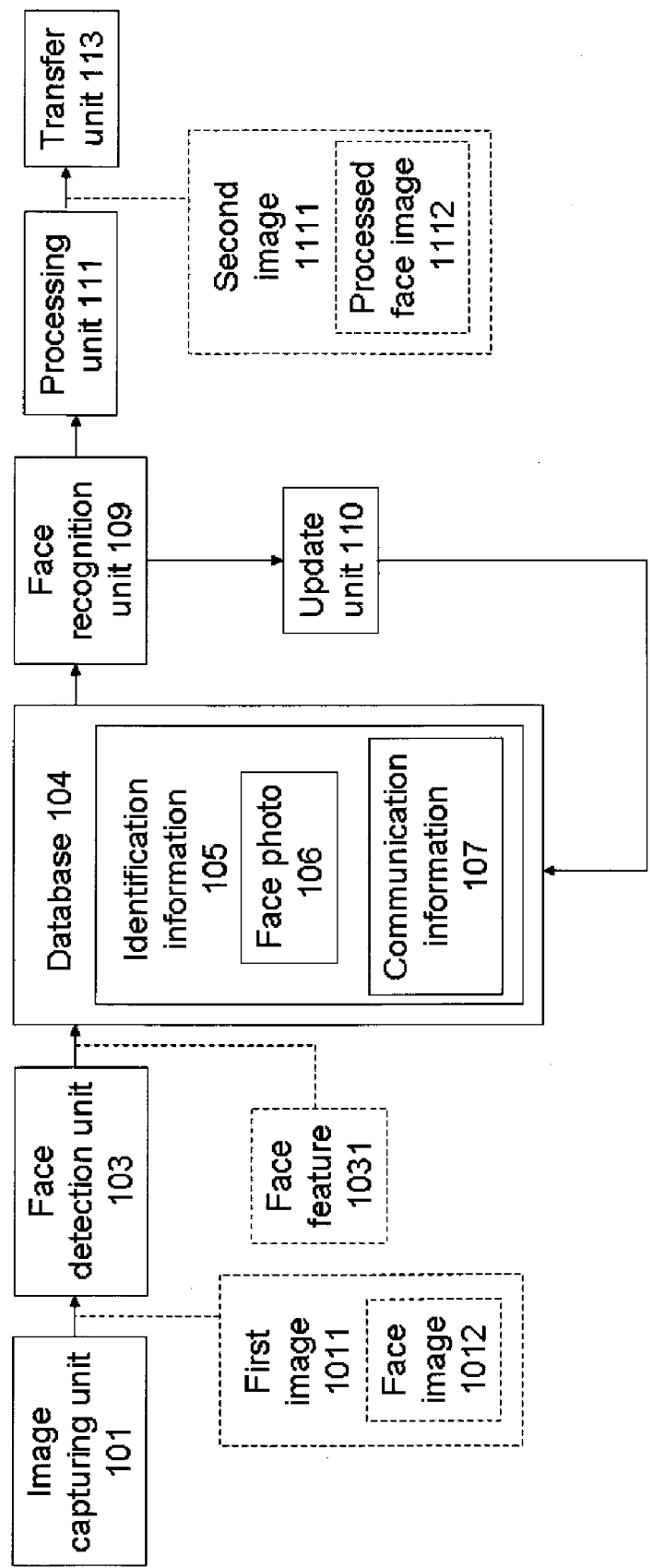
FIG. 1 is a block diagram of an image transfer apparatus of the present invention.

The technical characteristics of the present invention will become apparent with the detailed description of the preferred embodiments accompanied with the illustration of related drawings as follows. It is noteworthy to point out that the drawings are provided for the purpose of illustrating the present invention, but they are not necessarily drawn according to the actual scale, or are intended for limiting the scope of the invention, and same numerals used in the drawings represent same respective elements respectively.

With reference to FIG. 1 for a block diagram of an image transfer apparatus of the present invention, the image transfer apparatus comprises an image capturing unit 101, a face detection unit 103, a database 104, a face recognition unit 109, a processing unit 111 and a transfer unit 113. The image transfer apparatus of the present invention further comprises an update unit 110. Wherein, the database 104 comprises at least one identification information 105, and the identification information 105 comprises at least one face photo 106 and a communication information 107.

The image capturing unit 101 is provided for capturing a first image 1011 of the at least one face image 1012. And the face detection unit 103 performs a face detection of the first image 1011 to obtain at least one face feature 1031.

The face recognition unit 109 is provided for comparing the face feature 1031 with the face photo 106 saved in the database 104. If the face feature 1031 matches the face photo 106 saved in the database 104, then the communication information 107 and the identification information 105 corresponding to the face photo 106 will be retrieved from the database 104. Wherein, the communication information 107 is a telephone number or an email address, and the identification information 105 includes sex information and birthdate information. If the comparison result shows that the face feature 1031 does not match the face photo 106 in the database 104, the update unit 110 can be used to issue an instruction of reminding the user to add or update a face photo.

The processing unit 111 processes at least one face image 1012 corresponding to the identification information 105 in the first image 1011 according to the identification information 105 such as the sex information or birthdate information obtained by the face recognition unit 109, so as to obtain at least one second image 1111. Wherein, the processing unit 111 will generate a plurality of second images 1111, and only one face image of the second image 1111 will be processed, if there are plural identification information obtained by the face recognition unit 109.

Finally, the transfer unit 113 transmits the second image 1111 in a format of multimedia information or email and corresponding to the communication information of a processed face image 1112 in the second image 1111. Wherein, the transfer unit 113 can be used for performing a compressed transfer or a thumbnail transfer.

Figure 3:
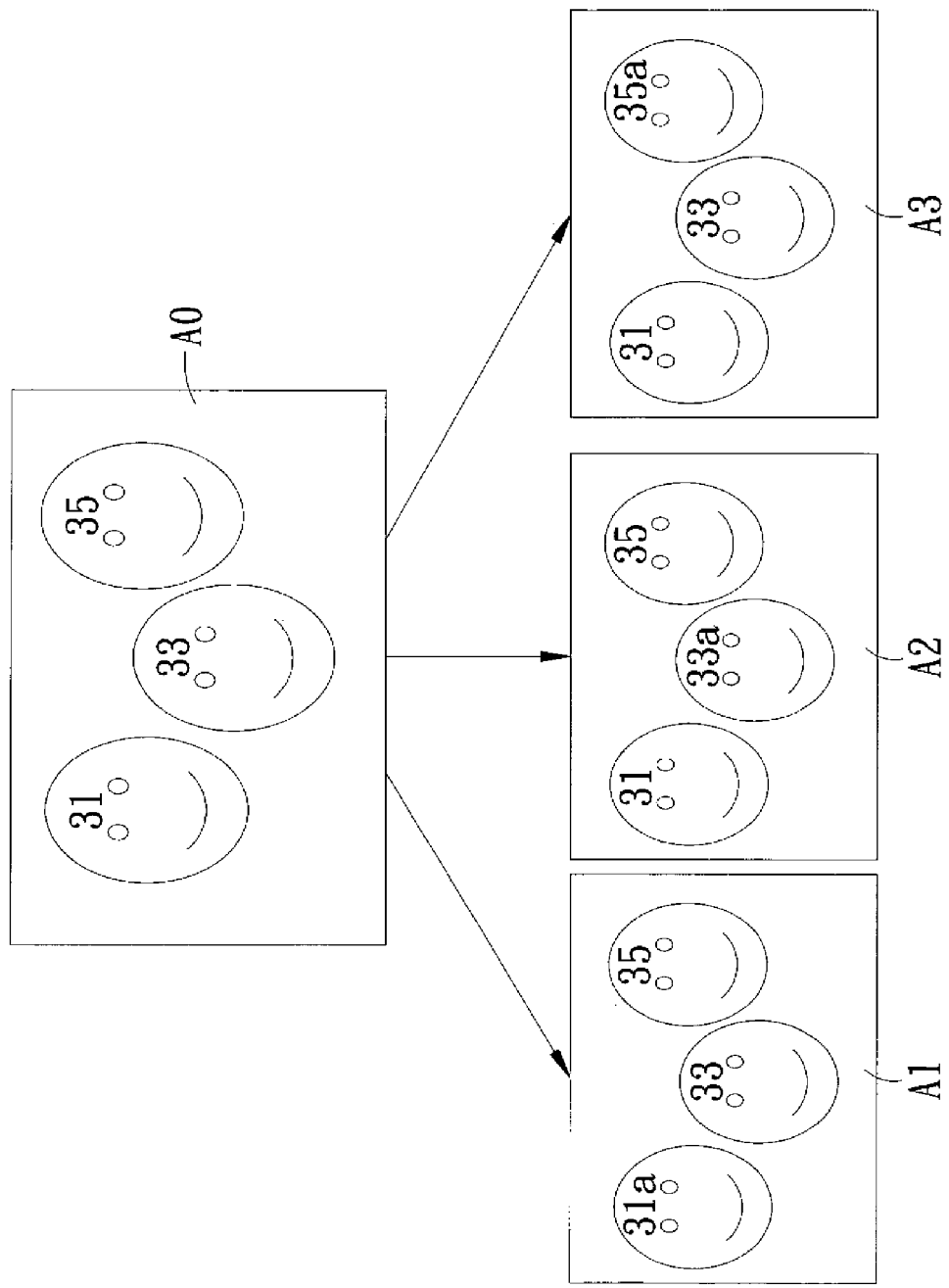
FIG. 3 is a schematic view of an image transfer apparatus in accordance with a preferred embodiment of the present invention.

The operating principle of an image transfer apparatus of the present invention is illustrated by the following preferred embodiment. With reference to FIGS. 1 and 3, FIG. 3 shows an image transfer apparatus in accordance with a preferred embodiment of the present invention, the image transfer apparatus is a Smartphone or a tablet PC with a built-in image capturing function.

In FIGS. 1 and 3, the user of the image transfer apparatus of the present invention can use an image capturing unit 101 of a Smartphone or a tablet PC to capture the first image 1011 of the at least one face image 1012. And then, the face detection unit 103 performs a face detection of the first image 1011 to obtain at least one face feature 1031. The face recognition unit 109 is used for comparing the face feature 1031 with the face photo 106 saved in the database 104. If the face feature 1031 matches the face photo 106 saved in the database 104, then the communication information 107 and the identification information 105 corresponding to the face photo 106 are retrieved from the database 104. Wherein, the communication information 107 is a telephone number or an email address, and the identification information 105 includes sex information or birthdate information. If a comparison result shows that the face feature 1031 does not match the face photo 106 saved in the database 104, the update unit 110 can be used to remind an user to add or update a face photo.

And then, the processing unit 111 processes at least one face image 1012 corresponding to the identification information 105 in the first image 1011 according to the identification information 105 such as the sex information or the birthdate information obtained by the face recognition unit 109, so as to obtain at least one second image 1111. In other words, if plural identification information are obtained by the face recognition unit 109, the processing unit 111 will generate a plurality of second images, and only one face image 1012 of the second image 1111 will be processed.

For example, the processing unit 111 will only optimize individual and distinguished transmitting object according to the birthdate information and the sex information corresponding to the face images 31, 33 and 35 obtained by the face recognition unit 109. For example, only the face image 31 is processed for transmitting the second image A1 corresponding to the communication information according to the face image 31. If the identification information corresponding to the face image 31 in the database is female, the face image 31 is optimized and processed with muscle smoothing treatment, big eye treatment, skin whitening treatment, skin color softening treatment or color saturation adjustment, and then a new face image 31a is obtained, and the remaining face images 33 and 35 are not optimized.

The image transfer apparatus recognizes three face images 31, 33 and 35 in the first image A0, and three processed second images A1, A2 and A3 corresponding to three individual identification information 105 are generated according to the image feature of the face image, and only one face image in the second image is processed. For example, only the processed face image 31a of the face image 31 in the second image A1 is transmitted according to the communication information corresponding to the face image 31, and the remaining two face images 33 and 35 of the second image A1 remain not processed. Wherein, the face images 33 and 35 in the second image A1 are identical to the face images 33 and 35 in the first image A0.

Similarly, only the processed face image 33a of the face image 33 in the second image A2 to be transmitted according to the communication information corresponding to the face image 33 will be transmitted, and the remaining two face images 31 and 35 will not be processed. In other words, the face images 31 and 35 in the second image A2 are identical to the face images 31 and 35 in the first image A0. Similarly, only the processed face image 35a of the face image 35 in the second image A3 are transmitted according to the communication information corresponding to the face image 35, and the remaining two face images 31 and 33 will remain not processed.

Finally, the transfer unit 113 transmits the second image 1111 in a format of multimedia information or email according to the communication information of the processed face image 1112 in the second image 1111, wherein the transfer unit 113 performs a compressed transfer or a thumbnail transfer.

Figure 4:
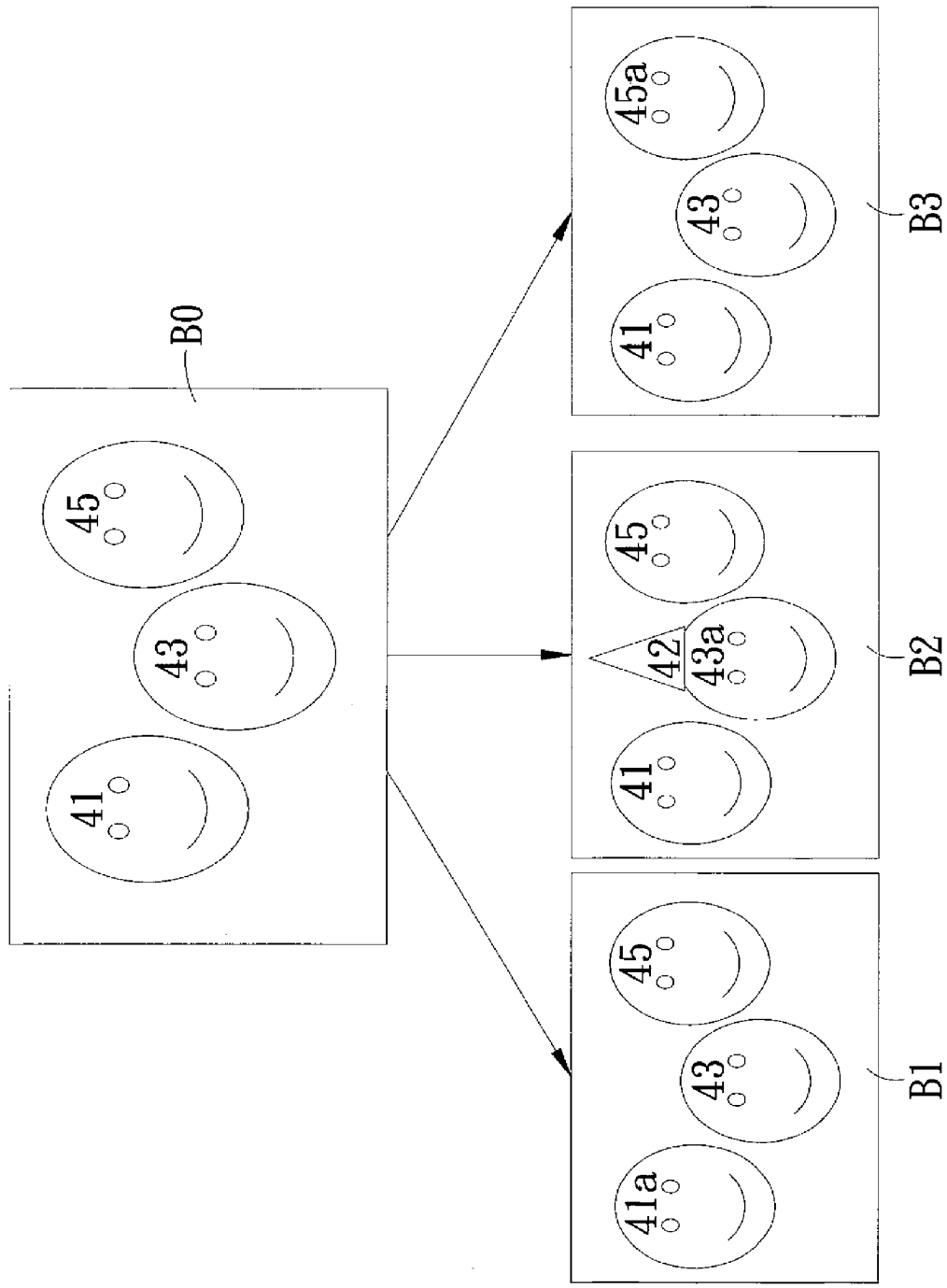
FIG. 4 is a schematic view of an image transfer apparatus in accordance with another preferred embodiment of the present invention.

With reference to FIGS. 1 and 4, FIG. 4 is a schematic view of an image transfer apparatus in accordance with another preferred embodiment of the present invention. In FIGS. 1 and 4, the image transfer apparatus of this preferred embodiment of the present invention is a camera with a network transmission function, wherein an image capturing unit 101 of the camera is provided for capturing an image including the first image 1011 of the at least one face image 1012. The face detection unit 103 performs a face detection of the first image 1011 to obtain at least one face feature 1031.

The face recognition unit 109 is provided for comparing the face feature 1031 with the face photo 106 saved in the database 104. If the face feature 1031 matches the face photo 106 saved in the database 104, the communication information 107 and the identification information 105 corresponding to the face photo 106 are retrieved from the database 104. Wherein, the communication information 107 is a telephone number or an email address, and the identification information 105 includes sex information and birthdate information. The update unit 110 reminds an user to add or update a face photo if the face feature 1031 does not match the face photo 106 saved in the database 104.

Further, the processing unit 111 processes at least one face image 1012 corresponding to the identification information 105 in the first image 1011 according to the identification information 105 such as the sex information or the birthdate information obtained by the face recognition unit 109, so as to obtain at least one second image 1111. For example, the processing unit 111 only performs individual and distinguished optimization for a desired transmitting object according to the birthdate information and the sex information corresponding to the face images 41, 43 and 45 in the first image B0 obtained by the image face recognition unit 109. In other words, after the first image B0 is captured, three face images 41, 43 and 45 are detected and recognized to generate three processed second images B1, B2 and B3, and only the face image 41 is processed with individual optimization for the second image B1 to be transmitted according to the communication information corresponding to the face image 41, so as to obtain the optimized face image 41a.

If the identification information corresponding to one of the information saved in the database is female, the face image 41 is processed with an image optimization such as the muscle smoothing treatment, big eye treatment, skin whitening treatment, skin color softening treatment or color saturation adjustment. In the second image B1 transmitted according to the communication information corresponding to the face image 41, the remaining face images 43 and 45 will not be processed with the optimization. Similarly, after the first image B0 is captured, second image B2 is transmitted according to the communication information corresponding to the face image 43. If the photographing date is a birthday of a person corresponding to the face image 43, the second image B2 will be transmitted according to the communication information corresponding to the face image 43. Particularly for a processed face image 43a of the face image 43 with an image optimization, a special pattern processing is performed to add a birthday cap 42, and the remaining two face images 41 and 45 in the second image B2 will not be processed, so as to keep both face images 41 and 45 in the first image B0 identical.

Finally, the transfer unit 113 performs a compressed transfer of the three processed second images B1, B2 and B3 in a format of multimedia information according to the communication information corresponding to each processed face image 41a, 43a and 45a in the second images B1, B2 and B3 respectively.

Figure 2:
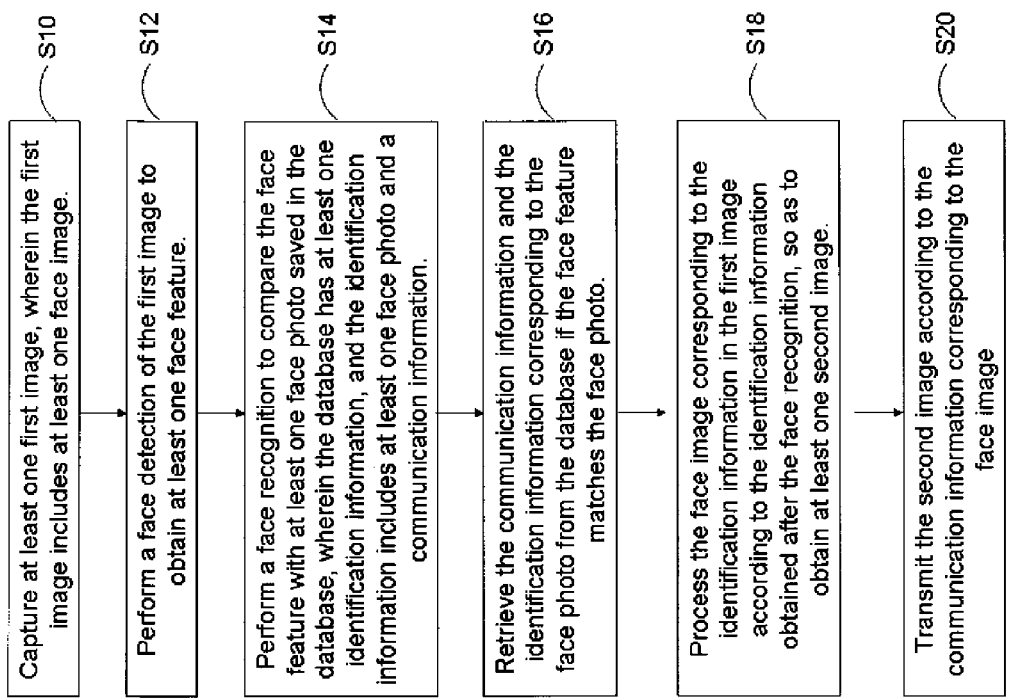
FIG. 2 is a flow chart of an image transfer method of the present invention.

With reference to FIGS. 2, 3 and 4, FIG. 2 is a flow chart of an image transfer method of the present invention, the image transfer method comprises the following steps:

S10: Use an image capturing unit to capture at least one first image, wherein the first image includes at least one face image.

S12: Perform a face detection of the first image to obtain at least one face feature.

S14: Perform a face recognition to compare the face feature obtained in the step S12 with at least one face photo saved in the database, wherein the database has at least one identification information, and the identification information includes at least one face photo and a communication information.

S16: Retrieve the communication information and the identification information corresponding to the face photo from the database if the face feature matches the face photo. Wherein, the communication information is an email address or a telephone number, and the identification information includes birthdate information and sex information. If the face feature does not match the face photo saved in the database, an user will be reminded to add or update a face photo.

S18: Process at least one face image corresponding to the identification information in the first image according to the identification information obtained after the face recognition takes place, so as to obtain at least one second image.

For example, only the individual and distinguished transmitting object is optimized according to the birthdate information and the sex information corresponding to the face images 31, 33 and 35 obtained after the face recognition takes place. If the identification information corresponding to the face image 31 is female, and the second image A1 is transmitted according to the communication information corresponding to the face image 31, the skin whitening treatment, the muscle smoothing treatment, and the big eye treatment will be optimized and processed to obtain the face image 31*a*, and the remaining face images 33 and 35 will not be optimized or processed. In FIG. 4, if the photographing date is a birthdate of a person corresponding to a face image 43 in the image, then the second image B2 will be transmitted according to the communication information corresponding to the face image 43, particularly the face image 43 of the birthday person is optimized and processed with the muscle smoothing treatment, the skin color softening treatment to obtain the face image 43*a*, and special pattern processing is perform to add a birthday cap 42.

For the face images 41 and 45 corresponding to persons of different sexes, the weight of individual's optimization is set differently. For example, the weight of optimizing the skin whitening treatment and the big eye treatment of a face image 41 corresponding to a male is relatively lower, and the weight of optimizing the skin whitening treatment and the big eye treatment of a face image 45 corresponding to a female is relatively higher.

S20: Perform a thumbnail transfer of a processed second image 1111 in a format of electronic email according to the communication information corresponding to the processed face image 1112 in the second image 1111, such that a receiver can view the photo quickly and examine which photo has a better photographic effect, so as to request the person taking the photo with the better photographic effect to send the original file of the photo.

Figure 5:
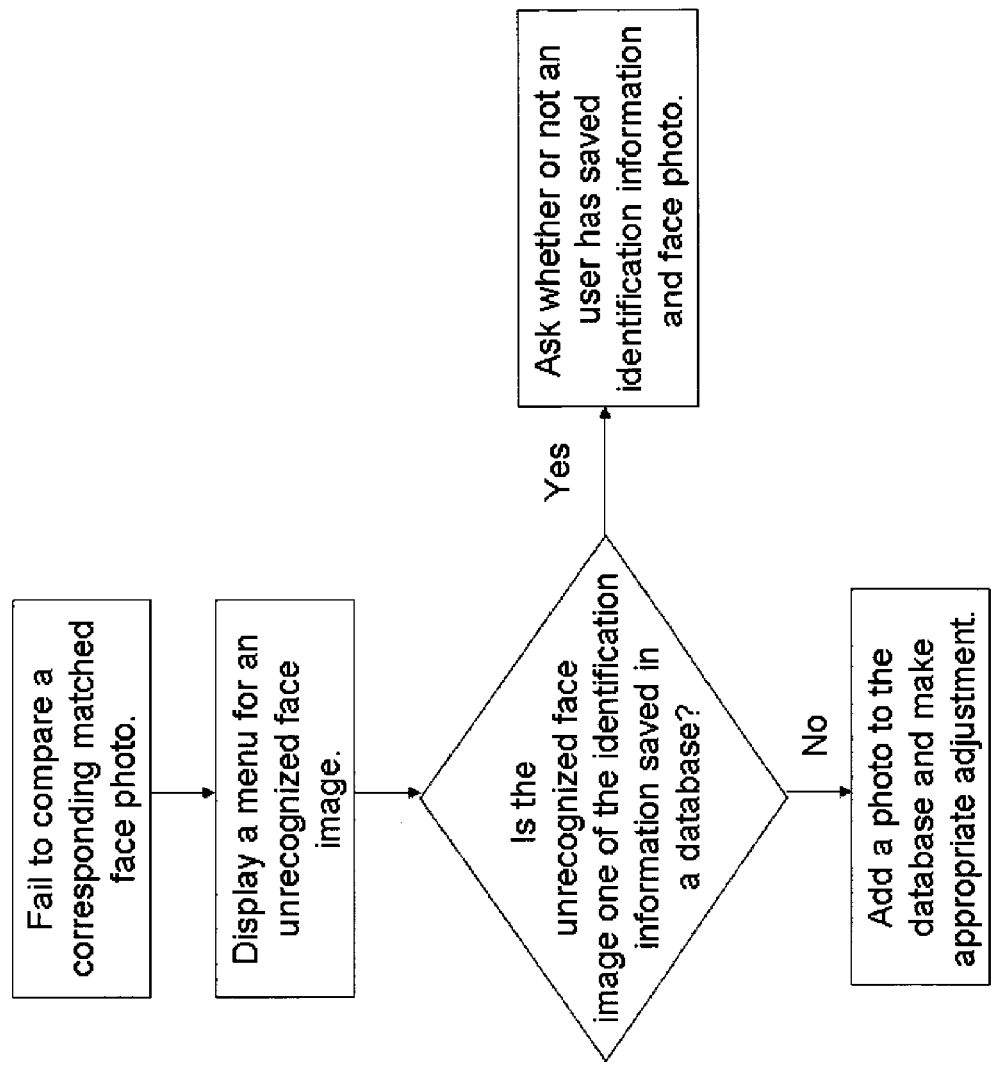
FIG. 5 is a flow chart of implementing an update unit of an image transfer apparatus of the present invention.

With reference to FIGS. 1 and 5 for a block diagram of an image transfer apparatus of the present invention and a flow chart of an implementation of an update unit of an image transfer apparatus in accordance with the present invention respectively, the flow chart comprises the following steps:

S91: If the face feature 1031 detected by the face detection unit 103 cannot match any identification information 105 saved in the database 104 and corresponding to the face photo, then the procedure will carry out the following step.

S93: Display a menu for an unrecognized face image 1012.

S95: Provide a menu to show whether or not the unrecognized face image 1012 is the identification information 105 that has been saved in the database 104, so that an user can determine whether or not the unrecognized face image 1012 is the identification information 105 that has been saved in the database 104.

If the unrecognized face image 1012 is the identification information 105 that has been saved in the database 104, then the procedure enters into the next step.

S96: Add a photo to the database 104 and make an appropriate adjustment to improve the recognition rate. In addition, if the identification information with the person of the face image 1012 has not been saved as a new friend in the database 104, then the procedure will carry out the following step.

S97: Ask the user whether or not to save the identification information such as a name, birthdate information or sex information, a face photo and the communication information such as an email address or a telephone number to create new contact information and photo.

While the invention has been described by means of specific embodiments, numerous modifications and variations could be made thereto by those skilled in the art without departing from the scope and spirit of the invention set forth in the claims.

What is claimed is:

1. An image transfer apparatus, comprising:
   an image capturing unit, adapted to capture at least one first image, wherein the first image includes a plurality of face images;
   a face detection unit, adapted to perform a face detection of the plurality of face images to obtain a plurality of face features respectively;
   a database, having identification information, and the identification information including a plurality of face photos and communication information corresponding to the plurality of face photos;
   a face recognition unit, adapted to compare the plurality of face features with the plurality of face photos, and if one of the plurality of face features matches one of the plurality of face photos, retrieving the communication information and the identification information corresponding to the matched face photo from the database;
   a processing unit, adapted to perform at least one image processing of one of the plurality of face images corresponding to the matched face feature to generate a second image based on the retrieved identification information, wherein the image processing for generating the second image is dependent from an identity of the matched face feature in the first image; and
   a transfer unit, adapted to transmit the second image according to the communication information of the processed face image, wherein the communication information comprises an email address.

2. The image transfer apparatus of claim 1, further comprising an update unit, adapted to remind a user to add or update the plurality of face photos if the plurality of face images do not match the plurality of face photos.

3. The image transfer apparatus of claim 1, wherein the transfer unit is provided for performing a compressed transfer or a thumbnail transfer.

4. The image transfer apparatus of claim 1, wherein the processing unit generates a plurality of second images if there are plural identification information obtained by the face recognition unit, and only one of the plurality of face images is processed by the image processing in each of the plurality of second images.

5. The image transfer apparatus of claim 1, wherein the communication information further comprises a telephone number, and the second image is transmitted in a format of multimedia information or email.

6. An image transfer method, comprising:
   capturing at least one first image, wherein the first image comprises a plurality of face images;
   performing a face detection of the plurality of face images to obtain a plurality of face features respectively;
   performing a face recognition, and comparing the plurality of face features with a plurality of face photos of a database, wherein the database has identification information, and the identification information includes the plurality of face photos and communication information corresponding to the plurality of face photos;
   retrieving the communication information and the identification information corresponding to one of the plurality of face photos from the database, if one of the plurality of face features matches one of the plurality of face photos;
   performing at least one image processing of one of the plurality of face images corresponding to the matched face feature to generate a second image based on the retrieved identification information, wherein the image processing for generating the second image is dependent from an identity of the matched face feature in the first image; and transmitting the second image according to the communication information of the processed face image, wherein the communication information comprises an email address.

7. The image transfer method of claim 6, further comprising:
reminding a user to add or update a face photo, if the plurality of face features do not match the plurality of face photos.

8. The image transfer method of claim 6, wherein the second image is transmitted according to the communication information corresponding to the processed face image through a compressed transfer or a thumbnail transfer.

9. The image transfer method of claim 6, wherein a plurality of second images is generated if a plurality of identification information is obtained after the face recognition takes place, and only one of the plurality of face images is processed by the image processing in each of the plurality of second images.

10. The image transfer method of claim 6, wherein the communication information further comprises a telephone number, and the second image is transmitted in a format of multimedia information or email.

\* \* \* \* \*